US006284921B1

(12) United States Patent
Luhtala

(10) Patent No.: US 6,284,921 B1
(45) Date of Patent: Sep. 4, 2001

(54) METHOD FOR PREPARING A FERTILIZER

(75) Inventor: Jarmo Luhtala, Helsinki (FI)

(73) Assignee: Kemira Agro Oy (FI)

( * ) Notice: Subject to any disclaimer, the term of this patent is extended or adjusted under 35 U.S.C. 154(b) by 0 days.

(21) Appl. No.: 09/000,141
(22) PCT Filed: Jul. 26, 1996
(86) PCT No.: PCT/FI96/00424
§ 371 Date: Apr. 23, 1998
§ 102(e) Date: Apr. 23, 1998
(87) PCT Pub. No.: WO97/05084
PCT Pub. Date: Feb. 13, 1997

(30) Foreign Application Priority Data

Jul. 28, 1995 (FI) ........................................ 953613

(51) Int. Cl.$^7$ ............................ C05C 9/02; C07C 275/02
(52) U.S. Cl. ............................... 564/1.5; 564/60; 504/327
(58) Field of Search ........................ 564/60, 1.5; 504/327

(56) References Cited

U.S. PATENT DOCUMENTS

| 3,227,543 | 1/1966 | O'Donnell . |
| 3,759,687 | 9/1973 | Nobell . |

FOREIGN PATENT DOCUMENTS

| 2536545 | 11/1976 | (DE) . |
| 3639581 | 5/1987 | (DE) . |

Primary Examiner—Shailendra Kumar
(74) Attorney, Agent, or Firm—Locke Liddell & Sapp LLP

(57) ABSTRACT

An oligomethylene urea product usable as a fertilizer can be more efficiently prepared in several steps by:
a) introducing at least urea and an aqueous solution of formaldehyde in the overall molar ratio of urea to formaldehyde of the step 1:1–2:1 into a reactor with a retention time of at least 0.5 h, a temperature maintained in the range of 40 to 95° C. and a pH maintained in the range of 6.5 to 11, in order to produce a methylol urea composition,
b) conducting the methylol urea composition to a second reactor with a temperature maintained in the range of 5 to 35° C. and a pH maintained in the range of 1.8 to 3.5, in order to produce a first oligomethylene urea slurry, and optionally,
c) conducting the methylol urea composition or the first oligomethylene urea slurry to a third reactor with a temperature maintained in the range of 5 to 35° C. and a pH maintained in the range of 1.8 to 3.5, to produce a second oligomethylene urea slurry,
d) conducting the oligomethylene urea slurry, selected from the first and the second oligomethylene urea slurry, to a filter and filtering it to form an oligomethylene urea precipitate and a filtrate,
e) recycling the filtrate to the reactor, selected from the second and the third reactor, and
f) neutralizing and drying the oligomethylene precipitate and recovering it as said oligomethylene urea product.

20 Claims, 1 Drawing Sheet

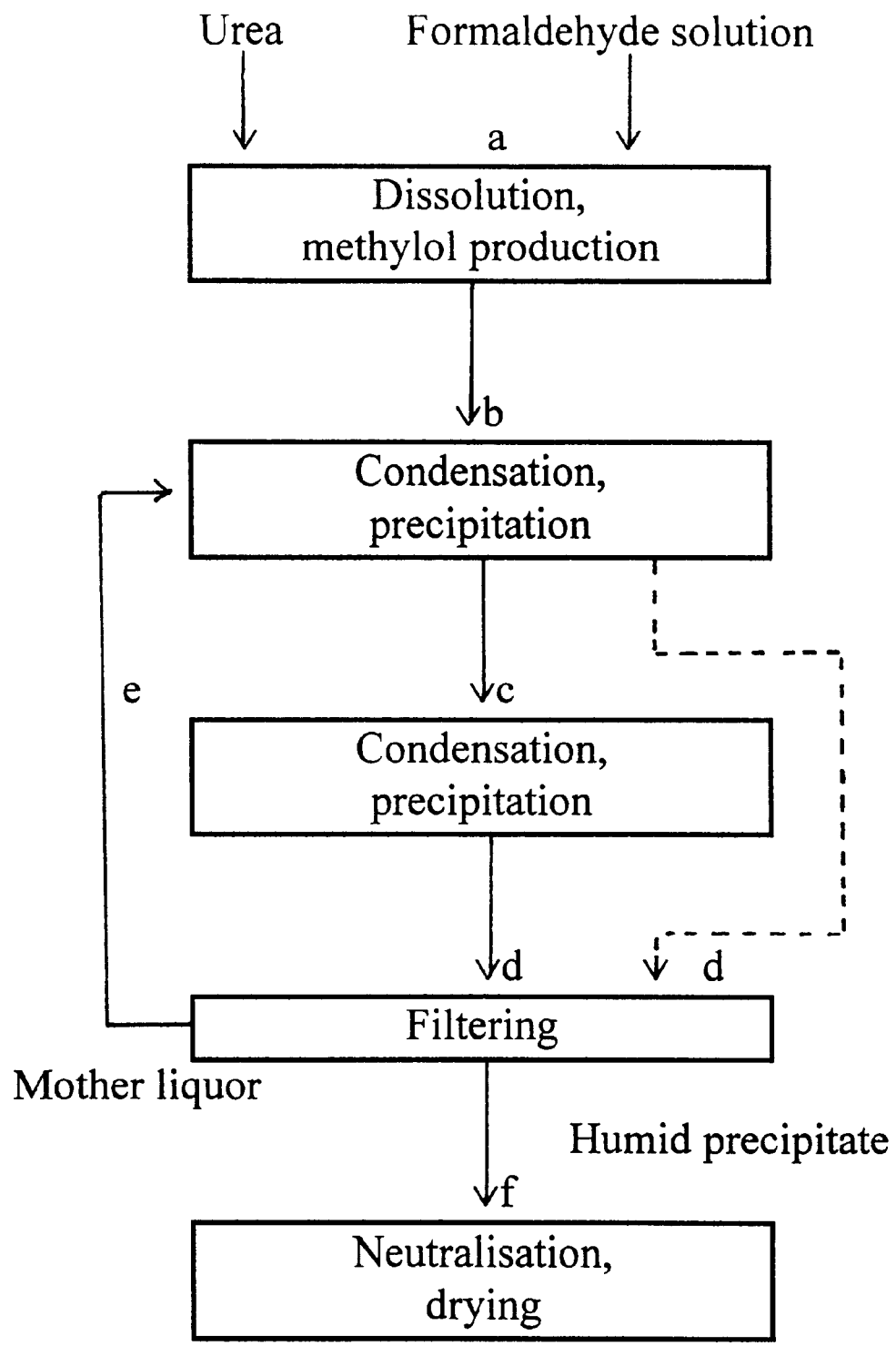
FIGURE

METHOD FOR PREPARING A FERTILIZER

This application is a 371 of PCT/FI96/00424, filed Jul. 26, 1996.

The invention relates to a method for preparing an oligomethylene urea product usable as a fertilizer by reacting urea and formaldehyde in several steps.

Oligomethylene ureas are reaction products of urea and formaldehyde, also called urea formaldehydes. Oligomethylene ureas are used for instance as slow nitrogen-release fertilizers, either as such or admixed with other fertilizers. Oligomethylene ureas having different molecular chain lengths decompose at different rates in the soil. The properties of oligomethylene ureas can also be assessed chemically by using the method called activity index analysis (official AOAC analysing process), whose activity index is determined as follows:

$$AI=(CWIN-HWIN) \cdot 100/CWIN$$

in which CWIN represents Cold Water Insoluble Nitrogen and HWIN Hot Water Insoluble Nitrogen.

This alone is not enough to characterize an oligomethylene urea composition, because the activity index AI is a relative variable. The absolute quantities of the various components are vital in terms of the fertilizer activity. Yet it is known that the HWIN fraction mineralizes at an extremely slow rate and is thus appropriate for fertilizing plants to be fertilized at very long intervals. The CWSN fraction (=$N_{tot}$-CWIN) mineralizes relatively fast. The central fraction (CWIN-HWIN) is most suitable for many purposes of use and processes frequently aim at maximizing this fraction.

The processes for preparing oligomethylene urea compositions can be divided into two main categories.

In the concentrated solution process, a concentrated solution made of urea and formaldehyde is acidified, so that urea and formaldehyde are condensed into a solid product. This process has the advantage that liquid needs not to be processed in large amounts relative to the product amount, however, the process has the drawback of difficult neutralization of the solid product cake obtained, resulting but rarely in a commercial product with a homogenous pH value. In addition, the process is hard to perform under control so as to achieve the proper solubility characteristics for the product.

In the dilute solution process, aqueous urea and formaldehyde solutions are admixed in large amounts relative to the product amount. The particles generated after the condensation reaction at an acid pH are neutralized, whereupon the product is separated from the aqueous phase by filtering and/or centrifugating. The filtrate is recycled in the process and the product cake is dried so as to form a fertilizer. Although the dilute solution process results in better neutralization, it still has the drawback of requiring very large amounts of water to be processed.

The processes for preparing oligomethylene products can also be divided into single-step and two-step processes.

In the single-step process, an aqueous solution containing urea and formaldehyde is immediately acidified, yielding a condensate in solid state. This process is exemplified in DE patent specification 2 422 238, in which the formaldehyde solution is slowly added to an aqueous urea solution under strictly determined conditions. A second single-step process is described in U.S. Pat. No. 4,173,582, in which urea and formaline (aqueous solution of formaldehyde) are contacted, the solution formed is acidified in order to yield a solid condensate, and the product cake formed is filtered, whereupon the filtrate is returned to the urea dissolving vessel.

In the two-step process, the pH of an aqueous solution of urea and formaldehyde is first raised to an alkaline state in order to yield methylol urea products. After this, the reaction mixture is acidified in order to condensate the methylol urea products into solid oligomethylene urea products. Such a method has been described in DE patent specification 3 639 581, in which urea is reacted with formaldehyde in an aqueous solution, which has been raised to an alkaline state by means of salt of polyphosphoric acid. The methylol urea products thus produced are condensed by adding acid to the reaction mixture. The reaction mixture is totally dried.

The references cited above have not reached a satisfactory solution to the problem caused by difficult filtering and handling large amounts of water. Regarding these references, it is still true that effective filtering is achieved only by using very large amounts of water relative to the product quantity.

Thus the object of the invention is to provide a method for preparing an oligomethylene urea product usable as a fertilizer, which uses minimum amounts of liquid relative to the product yield. In addition, the method aims to achieve a product of optimally high quality and effective filtering in particular. These goals have now been achieved with a new method, which is mainly characterized by the following steps:

a) introducing at least urea and an aqueous solution of formaldehyde in the overall molar ratio urea to formaldehyde of the step 1:1–2:1 into a first reactor, having a retention time of at least 0.5 h, a temperature maintained in the range of 40 to 95° C. and a pH maintained in the range of 6.5 to 11, in order to yield a methylol urea composition, b) conducting the methylol urea composition to a second reactor, having a temperature maintained in the range of 5 to 35° C. and a pH maintained in the range of 1.8 to 3.5 in order to yield a first oligomethylene urea slurry, or optionally, c) conducting the methylol urea composition or the first oligomethylene urea slurry to a third reactor, having a temperature maintained in the range of 5 to 35° C. and a pH maintained in the range of 1.8 to 3.5 in order to yield a second oligomethylene urea slurry, d) conducting an oligomethylene urea slurry, selected from the first or the second oligomethylene urea slurry, to a filter and filtering it to form an oligomethylene urea cake and a filtrate, e) recycling the filtrate to the reactor, selected from the second or the third reactor, and f) neutralizing and drying the oligomethylene urea precipitate and recovering it as said oligomethylene urea product.

BRIEF DESCRIPTION OF DRAWING

The various steps of the method in accordance with the invention are illustrated in the accompanying FIGURE.

Thus, it has been found that recycling the filtrate from the filter to a condensating reactor rather than an urea dissolving vessel enables the following operations to be accomplished:

1. dissolving the urea to form a concentrated solution in formaldehyde in the first reactor,
2. reacting the urea for a relatively long period of time already in the dissolving step, which makes the consecutive condensing reaction faster and more complete and reduces the volume requirement in the second or optionally the second and the third reactor, thus yielding a more flexible process, which is easier to control,
3. acting on the process efficiency by means of the recycling rate of the filtrate such that an increased recycling rate increases the filtering liquid and improves the filtering result without large overall amounts if water, and
4. achieving concentrated solutions even with batch operation.

Consequently, in step a) of the method in accordance with the invention, urea and an aqueous solution of formaldehyde is introduced in the first reactor in an overall molar ratio of urea to formaldehyde of the step 1:1–2:1. When necessary, water can be introduced in the first reactor. Urea and formaldehyde are then preferably introduced in the reactor in such amounts that the joint concentration of urea, formaldehyde and any reaction product of these in water, calculated as pure formaldehyde and urea, is in the range of 600 to 900 g/kg, most preferably in the range of 700 to 800 g/kg. This concentration then corresponds to an approx. 70 to 80% solution. It is obvious that a rapid reaction between urea and formaldehyde takes place in such a concentrated solution.

As stated above, the retention time in the first reactor, i.e. that of step a), is at least 0.5 h, implying that in a batch process, the reagents are retained in the first reactor over this period, and in a continuous process, the average retention time of the reagents equals this period. The first reactor is maintained at a temperature in the range of 40 to 95° C. and at a pH in the range of 6.5 to 11. At a raised temperature and at a neutralized or alkaline pH, urea and formaldehyde will react so as to form a methylol urea composition. In this conjunction, a methylol urea composition implies a composition containing inter alia urea, monomethylol urea $NH_2CO—NHCH_2OH$ and dimethylol urea $HOCH_2NH—CO—NHCH_2OH$, The overall molar ratio of urea to formaldehyde in step a) means that they can be introduced in the first reactor at a varying rate and in a varying speed ratio, however, this ratio determines their overall amount ratio in a batch process, and their average addition speed ratio during the process in a continuous process. Introducing urea, formaldehyde and water into the first reactor as mentioned in step a) implies that urea may be introduced in the reactor either in a solid state or as a solution and formaldehyde may be added as an unstabilized or stabilized aqueous solution or as a stabilized formaldehyde-water concentrate, and in that case water may be added separately, if necessary.

In step b) of the method in accordance with the invention, the methylol urea composition is conducted to the second reactor. The temperature of the second reactor is maintained in the range of 5 to 35° C., which is considerably lower than the temperature of the first reactor. In accordance with the invention, the conversion into methylol urea occuring in step a) is so high that it allows the temperature in step b) to be maintained at this low level, while the high condensation rate is simultaneously maintained owing to the high methylol content. The pH of the second reactor is maintained in the range of 1.8 to 3.5, in other words in a markedly acid state. The retention time in this reactor is preferably in the range of 10 to 90 minutes, implying in a process of batch type that the methylol urea composition is maintained in the conditions of the step preferably over said period, whereas in a continuous process, it means that the average retention time of the fed methylol urea composition in the second reactor is preferably in the range of 10 to 90 minutes. This step comprises condensation of the methylol ureas into an oligomethylene urea composition, which simultaneously precipitates in water, forming the oligomethylene urea slurry mentioned above.

Even if one single condensation reactor, i.e. the second reactor mentioned above, is enough for the invention to be operational, it is, however, preferable that at least a third reactor is connected after the second reactor or in parallel with this, so that, as defined in step c) the methylol urea composition obtained from the first reactor, or the first oligomethylene urea slurry obtained from the second reactor, is conducted to the third reactor. The conditions prevailing in the third reactor are not necessarily identical to the conditions of the second reactor, yet it is preferable to keep them within the same limits as in the second reactor, i.e. the temperature within the range of 5 to 35° C. and the pH within the range of 1.8 to 3.5. The retention time is preferably in the range from 10 to 90 minutes, cf. above. In step c), i.e. in the third reactor, a major part of the methylol urea intermediate product and the unreacted urea condensates, forming oligomethylene urea, which precipitates, thus forming a second oligomethylene urea slurry together with the first oligomethylene urea slurry. in step d) the oligomethylene urea slurry, selected from the first and the second oligomethylene urea slurry, is conducted to the filter. This is to say that, in absence of step c), the first oligomethylene urea slurry may be conducted to the filter, or when step c) is applied, the second oligomethylene urea slurry, or a mixture of these oligomethylene urea slurries is taken to the filter, so as to achieve as useful characteristics as possible for the filtering and the oligomethylene urea precipitate and filtrate yielded. However, it is advantageous to conduct said second oligomethylene urea slurry alone, resulting from the serial coupling, to the filter.

After filtering, the filtrate from the filtering in step e) is recycled to the reactor, which is selected from said second and third reactors. The filtrate being an acid aqueous solution, the methylol urea composition of step a) will actually be fed into an acid aqueous solution, which has not been done in previous processes. This has the advantage of the methylol ureas reacting under control and of the desired products being produced. When the reactors are serially connected, the filtrate is preferably recycled to the second reactor. Since it is known that the inventive idea is best realized by keeping concentrations higher in step a) and lower in steps b) and c), it is advantageous to conduct said methylol urea composition in step b) to the second reactor, to conduct said first oligomethylene urea composition in step c) to the third reactor, and to recycle the filtrate to the reactor in step e), the reactor being selected from the second and the third reactor, in a ratio such that the joint concentration of the urea, formaldehyde and reaction products of these in the second, or the second and third reactor, calculated as pure formaldehyde and urea, is in the range of 350 to 600 g/kg, preferably in the range of 400 to 500 g/kg. This regulation can also be defined such that the weight ratio of the recycled filtrate to the methylol urea composition removed from the first reactor, i.e. step a), is in the range of 1.2 to 2.4, preferably in the range of 1.5 to 2.1.

At the same time as the filtrate from filtering step d) is recycled to the reactors in step e), the oligomethylene urea precipitate is neutralized and dried if necessary, and eventually recovered as a process product, i.e. as an oligomethylene urea product.

Although a batch process, a semi-batch process and a continuous process have been discussed above, the benefits of the invention are best done justice in a continuous process. In this case, in step a) urea and formaldehyde and water are continuously introduced in the first reactor, in step b) the methylol urea composition is taken continuously to the second reactor, in step c) the first oligomethylene urea slurry is continuously conducted to the third reactor, in step d) the oligomethylene urea slurry is continuously conducted to the filter and is continuously filtered into an oligomethylene urea cake and a filtrate, in step e) the filtrate is continously recycled to the reactor, and in step f) the oligomethylene urea cake is continously neutralized and dried. Greater amounts at a time may naturally be introduced in the process, and material may accumulate in various steps of the process, within the limits of normal process practice.

Preferred embodiments of the parameters of the method in accordance with the invention are presented below. In some preferred embodiments of the invention, the following parameters are implemented independently of each other in step a):

the overall molar ratio of urea to formaldehyde is in the range of 1.2:1–1.9:1 in this step,
the retention time in the first reactor is in the range of 0.5 to 6 h, preferably 1 to 3.5 h,
the temperature is maintained in the range of 50 to 60° C.,
the pH is maintained in the range of 7 to 10.

In step a) the pH of the first reactor is kept in the range of 6.5 to 11 by means of a base, preferably a base selected among sodium hydroxide, ammonia, trisodium phosphate, sodium tripolyphosphate, sodium pyrophosphate and the corresponding potassium salts. It is preferable that the pH is maintained within the alkaline range by using an alkaline buffer.

In some preferred embodiments the following parameters are valid independently of each other in step b) and/or c):

the retention time in the second and/or third reactor is in the range of 10 to 35 minutes,
the temperature is maintained in the range of 10 to 25° C.,
the pH is maintained in the range of 2.1 to 3.0.

In step b) and/or c) the pH of the second and/or third reactor is kept in the range of 1.8 to 3.5 by means of an acid, preferably an acid selected among inorganic acids, such as sulphuric acid or phosphoric acid, and organic acids, such as citric acid, tartaric acid, fumaric acid or acetic acid.

Whenever necessary, in the method of the invention, the intermediate filtrate tank can be disposed such that in step e), the filtrate is recycled to the reactor, which is selected from said second and third reactor, over the intermediate tank.

Urea being a solid substance, it may be added in step a) either as such or in the form of an aqueous solution. In contrast, formaldehyde is a gas and thus it must be fed into the reactor in the form of an aqueous solution in practice. A typical aqueous solution is a 35 to 40% aqueous solution of formaldehyde, i.e. a so-called formaline solution. If more concentrated aqueous solutions of formaldehyde are preferred, they have to be kept warm. It is particularly advantageous to add a concentrated, e.g. 45 to 55% aqueous solution of formaldehyde in step a). The formaldehyde can also be stabilized and added as a stabilized aqueous solution. A typical example of this is an aqueous solution of formaldehyde which has reacted with a small amount of urea, from which, more preferably, water has been evaporated to concentrate the solution. The method in accordance with the invention enables products to be produced which are suitable for the various purposes of use of fertilizers.

A number of embodiment examples will be presented below with the sole purpose of illustrating the invention.

EXAMPLE 1

840 g of a 48% solution of formaldehyde was weighed into a 2.5 liter overflow reactor and its pH was adjusted to 9 by using a 25% solution of sodium hydroxide. 1,242 g of urea was added and the mixture was heated to 53° C. The mixture was allowed to react at 53° C. and at a pH of 9 for one hour, upon which 507 g/h of urea and 343 g/h of a 48% solution of formaldehyde was introduced in the reactor (U:F molar ratio of 1.54). The mixture was conducted as overflow to a cooled 0.8 liter oveflow reactor, containing first water and then mother liquor recycled from the filter. In the reactor, the pH was maintained at 2.6 by means of 50% sulphuric acid and the temperature was 10° C.

From this reactor, the mixture was conducted as overflow to a third reactor with a 0.6 liter volume and the same conditions as in the preceding reactor. From this reactor, the mixture was taken to a filter, filtering was carried out, and the filtrate was recycled to a 0.8 liter reactor at a flow rate of 1,500 ml/h. The precipitate was neutralized and dried at 80° C. After five hours of production a sample was taken for analysis. $N_{tot}$ was 40.3%, CWIN 25.3, HWIN 9.4 and AI 63.4. Because material was removed from the production equipment exclusively as a material flow, and no material accumulated in the process, a quantitative yield was obtained.

EXAMPLE 2

855 g of a 48% solution of formaldehyde was weighed in a 2.5 liter overflow reactor and its pH was adjusted to 9 with a 25% solution of sodium hydroxide. 1,400 g of urea was added and the mixture was heated to 53° C. The mixture was allowed to react at 53° C. and at a pH of 9 for one hour, whereupon 560 g/h of urea and 342 g/h of a 48% solution of formaldehyde was fed into the reactor (U:F molar ratio of 1.71). The mixture was conducted as overflow to a cooled 0.8 liter overflow reactor, which first contained water and later mother liquor recycled from the filter.

The pH of the reactor was first maintained at 2.6 by means of 50% sulphuric acid, but was dropped to 2.0 after five hours. The temperature of the mixture was maintained at 13° C. From this reactor, the mixture was conducted as overflow to a third reactor with a 0.6 liter volume and the same conditions as in the preceding reactor. From this reactor the mixture was taken to a filter, filtering was carried out, and the filtrate was recycled to a 0.8 liter reactor at a flow rate of 1,500 ml/h. The precipitate was neutralized and dried at 80° C. After 2 hours of production at a pH of 2, a sample was taken for analysis. $N_{tot}$ was 40.0%, CWIN 17.1, HWIN 4.3 and AI 74.7.

EXAMPLE 3

The conditions of example 2 were altered such that the pH was adjusted to 3.3 in the second and third reactor. After three hours of production, a sample was taken for analysis. $N_{tot}$ was 40.1%, CWIN 15.2%, HWIN 2.4% and AI 84.4.

EXAMPLE 4

1.100 g of a 45% solution of formaldehyde was weighed in a 2.5 liter overflow reactor and its pH was adjusted to 9 with a 25% solution of sodium hydroxide. 1.267 g of urea was added and the composition was heated to 53° C. The mixture was allowed to react at 53° C. at a pH of 9 for one hour, whereupon 507 g/h of urea and 440 g/h of a 45% solution of formaldehyde was introduced in the reactor (U:F molar ratio of 1.28). The composition was conducted as overflow to a cooled 0.8 liter overflow reactor, which first contained water and later on mother liquor recycled from the filter. The pH of the reactor was maintained at 2.6 by means of 50% sulphuric acid and the temperature at 13° C. From this reactor, the mixture was conducted as overflow to a third reactor with a 0.6 liter volume and the same conditions as in the preceding reactor. From this reactor, the mixture was taken to a filter, filtering was accomplished and the filtrate was recycled to a 0.8 liter reactor at a flow rate of 1,500 ml/h. The precipitate was neutralized and dried at 80° C.

After six hours of production a sample was taken for analysis. $N_{tot}$ was 38.7%. CWIN was 31.3, HWIN was 19.4 and AI 38.2.

EXAMPLE 5

90.6 g of a 48% solution of formaldehyde was weighed in a 0.2 liter overflow reactor and its pH was adjusted to 7 with a 25% solution of sodium hydroxide. 134.3 g of urea was added and the composition was heated to 53° C. The mixture was allowed to react for one hour at this temperature and pH, and then 40 g/h of urea and 27.1 g/h of a 48% formaline solution were added (U:F molar ratio of 1.54). The mixture was conducted as overflow to a second reactor, which first contained 68 g of water at 10° C. with a pH maintained at 2.6. After one hour the additions of urea and formaldehyde solution were interrupted for a moment and the product precipitated in the second reactor was filtered. The mother liquor was recycled to the same reactor and the feeding operations resumed. From there on, filtering of the product took place at intervals of half an hour. After the fifth filtering, the product was neutralized, dried and analyzed: $N_{tot}$ was 39.7%, CWIN 22.4%, HWIN 6.2% and AI 72.4.

EXAMPLE 6

The conditions were the same as in example 5, except that the pH of the dissolving reactor was maintained at 9 and the temperature at 75° C. The product from the sixth filtering was neutralized, dried and analyzed: $N_{tot}$ was 39.1%, CWIN 21.1%, HWIN 4.7% and AI 77.5.

EXAMPLE 7

The conditions were the same as in example 5, except that the urea feeding rate was 120 g/h and the feeding rate of the 48% solution of formaldehyde was 81.3 g/h, the average retention time in the dissolving reactor being 1 h. The water amount in the precipitating reactor was initially 204 g. The product from the third filtering was neutralized, dried and analyzed: $N_{tot}$ was 40.3%, CWIN 24.0%, HWIN 6.1% and AI 74.6.

EXAMPLE 8

The conditions were the same as in example 5, except that the urea feeding rate was 80 g/h and the feeding rate of the 48% solution of formaldehyde was 54.2 g/h, the water amount in the precipitating reactor being initially 136 g. A basic difference was the temperature in the precipitating reactor, which was maintained at 25° C.

I claim:
1. A method for preparing an oligomethylene urea product comprising:
   a) introducing at least urea and an aqueous solution of formaldehyde into a first reactor in the overall molar ratio of urea to formaldehyde of 1:1–2:1, the reactor having a retention time of at least 0.5 h, a temperature maintained in the range of 40 to 95° C. and a pH maintained in the range of 6.5 to 11, in order to produce a methylol urea composition,
   b) conducting the methylol urea composition to a second reactor, having a temperature maintained in the range of 5 to 35° C. and a pH maintained in the range of 1.8 to 3.5, in order to produce a first oligomethylene urea slurry and, optionally,
   c) conducting the methylol urea composition or the first oligomethylene urea slurry to a third reactor, having a temperature maintained in the range of 5 to 35° C. and a pH maintained in the range of 1.8 to 3.5, to produce a second oligomethylene urea slurry,
   d) conducting the oligomethylene urea slurry, which is selected from the first and the second oligomethylene urea slurries, to a filter and filtering it to form an oligomethylene urea precipitate and a filtrate,
   e) recycling the filtrate to the reactor, which is selected from the second and third reactor, and
   f) neutralizing and drying the oligomethylene urea precipitate and recovering it as said oligomethylene urea product.

2. A method as claimed in claim 1, characterized in that in step a), urea and formaldehyde are introduced in the first reactor such that the joint concentration in water of urea, formaldehyde and any reaction products of these, calculated as pure formaldehyde and urea, is in the range of 600 to 900 g/kg, preferably in the range of 700 to 800 g/kg.

3. A method as claimed in claim 1, in that in step b) said methylol urea composition is taken to a second reactor, in step c) said first oligomethylene urea composition is taken to a third reactor and in step e) the filtrate is recycled to the reactor, which is selected from the second and the third reactor, in a ratio such that the joint concentration of the urea, formaldehyde and any reaction product thereof, calculated as pure formaldehyde and urea, is in the range of 350 to 600 g/kg.

4. A method as claimed in claim 3, characterized in that the weight ratio of the recycled filtrate to the methylol urea composition removed from the first reactor is in the range of 1.2 to 2.4.

5. A method as claimed in claim 1, characterized in that it is a continuous process.

6. A method as claimed in claim 1, characterized in that in step a) the following parameters prevail independently of each other:
   the overall molar ratio of urea to formaldehyde in the step is in the range of 1.2:1–1.9:1;
   the retention time in the first reactor is in the range of 0.5 to 6 h,
   the temperature is maintained in the range of 50 to 60° C.,
   the pH is maintained in the range of 7 to 10.

7. A method as claimed in claim 1, characterized in that in step a) the pH of the first reactor is maintained in the range of 6.5 to 11 by means of a base.

8. A method as claimed in claim 1, characterized in that in step b) and/or c), the following parameters prevail independently of each other:
   the retention time in the second and/or the third reactor is in the range of 10 to 90 minutes, preferably 10 to 35 minutes,
   the temperature is maintained in the range of 10 to 25° C.,
   the pH is maintained in the range of 2.1 to 3.0.

9. A method as claimed in claim 1, characterized in that in step b) and/or c) the pH of the second and/or third reactor is maintained in the range of 1.8 to 3.5 by means of an acid.

10. A method as claimed in claim 1, characterized in that in step e) the filtrate is recycled to the reactor, which is selected from the second or third reactor, over an intermediate tank.

11. A method as claimed in claim 1, characterized in that in step a) formaldehyde and water are introduced in the first reactor in a form selected among the following:
   an aqueous solution of formaldehyde
   an aqueous solution of formaldehyde reacted with a small amount of urea, from which water has preferably been evaporated to concentrate the solution.

12. A method as claimed in claim 3, wherein the joint concentration of the urea, formaldehyde and any reaction product thereof is in the range of 400 to 500 g/kg.

13. A method as claimed in claim 4, wherein the weight ratio of the recycled filtrate to the methylol urea composition removed from the first reactor is in the range of 1.5 to 2.1.

14. A method as claimed in claim 6, characterized in that the retention time in the first reactor is in the range of 1 to 1.58.

15. A method as claimed in claim 7, characterized in that the base is selected from the group consisting of sodium hydroxide, ammonia, trisodium phosphate, sodium tripolyphosphate or sodium pyrophosphate and corresponding potassium salts.

16. A method as claimed in claim 9, characterized in that the acid is selected from the group consisting of sulphuric acid, phosphoric acid, citric acid, tartaric acid, fumaric acid and acetic acid.

17. A method as claimed in claim 11, characterized in that the aqueous solution of formaldehyde is a heated 45 to 55% aqueous solution of formaldehyde.

18. A method as claimed in claim 2, characterized in that in step b) said methylol urea composition is taken to a second reactor, in step c) said first oligomethylene urea composition is taken to a third reactor and in step e) the filtrate is recycled to the reactor, which is selected from the second and the third reactor, in a ratio such that the joint concentration of the urea, formaldehyde and any reaction product thereof, calculated as pure formaldehyde and urea, is in the range of 350 to 600 g/kg.

19. A method as claimed in claim 18, wherein the joint concentration of the urea, formaldehyde and reaction product thereof is in the range of 400–500 g/kg.

20. A method as claimed in claim 3, characterized in that in step a) the following parameters prevail independently of each other:

the overall molar ratio of urea of formaldehyde in the step is in the range of 1.2:1–1.9:1;

the retention time in the first reactor is in the range of 0.5 to 6 h, the temperature is maintained in the range of 50 to 60° C., the pH is maintained in the range of 7 to 10.

* * * * *

UNITED STATES PATENT AND TRADEMARK OFFICE
CERTIFICATE OF CORRECTION

PATENT NO.    : 6,284,921 B1
DATED         : September 4, 2001
INVENTOR(S)   : Jarmo Luhtala It is certified that error appears in the above-identified patent and that said Letters Patent is hereby corrected as shown below:

<u>Column 8,</u>
Line 18, after "...in Claim 1," please insert -- characterized --.

Signed and Sealed this

Fourteenth Day of May, 2002

Attest:

JAMES E. ROGAN
Attesting Officer    Director of the United States Patent and Trademark Office